United States Patent [19]

Dudden et al.

[11] 4,357,124

[45] Nov. 2, 1982

[54] POWER FEED ROTARY TOOL

[75] Inventors: Christopher J. Dudden, Boscombe; Peter J. Blomfield, Flitwick, both of England

[73] Assignee: Desoutter Limited, London, England

[21] Appl. No.: 166,616

[22] Filed: Jul. 7, 1980

[51] Int. Cl.³ ............................................. B23B 47/22
[52] U.S. Cl. .................................... 408/130; 408/128
[58] Field of Search ............... 408/124, 128, 129, 130, 408/241 R; 173/149, 150

[56] References Cited

U.S. PATENT DOCUMENTS 3,162,091 12/1964 Keller .................................. 408/128
3,663,138 5/1972 Petroff ................................ 408/130
4,105,361 8/1978 Petroff ................................ 408/130

FOREIGN PATENT DOCUMENTS 2526590 12/1976 Fed. Rep. of Germany ...... 408/130
956081 4/1964 United Kingdom .

*Primary Examiner*—Leonidas Vlachos
*Assistant Examiner*—Jerry Kearns
*Attorney, Agent, or Firm*—Holman & Stern

[57] ABSTRACT

A power feed rotary tool, such as a drill or a tapper, has an electric motor for rotating the working head and a pneumatic system for advancing the working head. A control rod extends from one end of the tool housing, and is displaced together with the working head, but does not rotate. The control rod controls the feed stroke of the working head. The electric motor is connected to the tool housing between its ends.

6 Claims, 3 Drawing Figures

POWER FEED ROTARY TOOL

BRIEF SUMMARY OF THE INVENTION

This invention relates to a power feed rotary tool, where the working head of the tool is rotated by an electric motor, and is fed towards the workpiece pneumatically. The tool will normally be a drill or a tapper, but the invention could also be applied to a screwdriver or a nut-runner, with or without torque control.

The invention is a development of a power-feed drill described in our earlier British Pat. No. 956 081. This patent describes a drill where both drill rotation and feed are pneumatically operated. In many instances where a number of such tools are used, the volume of compressed air which is available prevents the use of additional, completely pneumatically operated tools. The use of an electric motor to replace the high air consumption rotary pneumatic drive can avoid this problem.

Rotary tools of this type are frequently combined in a jig to form a unit capable of drilling a number of adjacent holes simultaneously in a workpiece. In such applications, it is important that the individual tools can be closely spaced, and that the controls for adjusting the depth of feed to each tool be still accessible.

According to the invention, there is provided a power feed rotary tool having an electric motor for rotating a working head of the tool, and a pneumatic system for feeding the working head towards a workpiece, the tool having an elongate housing with the working head at one end of the housing, a drive train within the housing for rotating the working head, a piston within the housing for displacing the working head, as it rotates, towards the workpiece, a control rod at the other end of the housing which is restrained from rotating, but is connected to the drive train so as to be displaced together with the working head, the control rod including an abutment for limiting the displacement of the working head, the electric motor being drivingly connected to the drive train between said ends of the housing.

This arrangement, with the control rod extending from the top of the housing, makes adjustment of the feed of the working head very easy because no matter how many other tools are surrounding a particular tool, the control abutment is always accessible for adjustment. This has always been the case in completely pneumatically operated tools. In the case of pneumatic tools, the rotary air motor which rotates the working head can be accommodated completely within the elongate housing and spaced from the working head just sufficiently to leave enough space for the necessary gears. There is therefore no problem in providing a non-rotating control rod which is displaced with the working head and which can be connected to the stator of the motor. However, an electric motor with the necessary power output is of a size which must be mounted externally of the elongate housing. An externally mounted motor is asymmetrical relative to the axis of the tool and it is not practical to move the motor together with the displacement movement of the working head.

In a preferred embodiment, the control rod is connected to the drive train via a thrust bearing on the side of the motor driving connection nearest to said other end of the housing. The control rod itself can be restrained outside the housing against rotation, and the bearing enables the drive train to continue rotating while the control rod is held stationary.

In an alternative form of embodiment, which may be used with the previously described thrust bearing or on its own, a tie rod extends parallel to the displacement axis of the tool between a part fixed to the control rod and a part on the opposite side of the motor drive connection which does not rotate but is displaced together with the working head.

The driving connection between the motor and the drive train is preferably by means of a toothed belt running around appropriately toothed pulleys on the motor output shaft and part of the drive train. A specially adapted device may be provided to tension the drive belt. This device can be plugged into a drive belt housing, and can be operated to pull the motor plate in the direction of tensioning the belt until the spring force of a spring contained in the device is overcome to indicate that the correct tension has been reached in the belt.

It is very advantageous if the control top of the tool can be rotated relative to the rest of the tool. The control top includes the control rod and operating controls and connections to external services. In one preferred form of the invention, the control top is attached to the elongate housing by means of a sleeve having threads of opposite hands at its two ends. At one end, this sleeve screws onto a corresponding thread on the end of the elongate housing, and at the other end the sleeve screws onto a corresponding thread on the control top. A spacer is positioned between the housing and the control top. To alter the position of the control top, the sleeve is slackened sufficiently for the control top to be manually turned through the desired angle. Once the control top is in the correct position, the sleeve can be tightened up against the spacer to hold the top in the correct angular position. Although threads of opposite hand are preferred, the threads could be of the same hand with little difference in the way that this rotation is carried out.

BRIEF DESCRIPTION OF THE DRAWINGS

The invention will now be further described, by way of example with reference to the accompanying drawings, in which.

DETAILED DESCRIPTION

Figure 1:
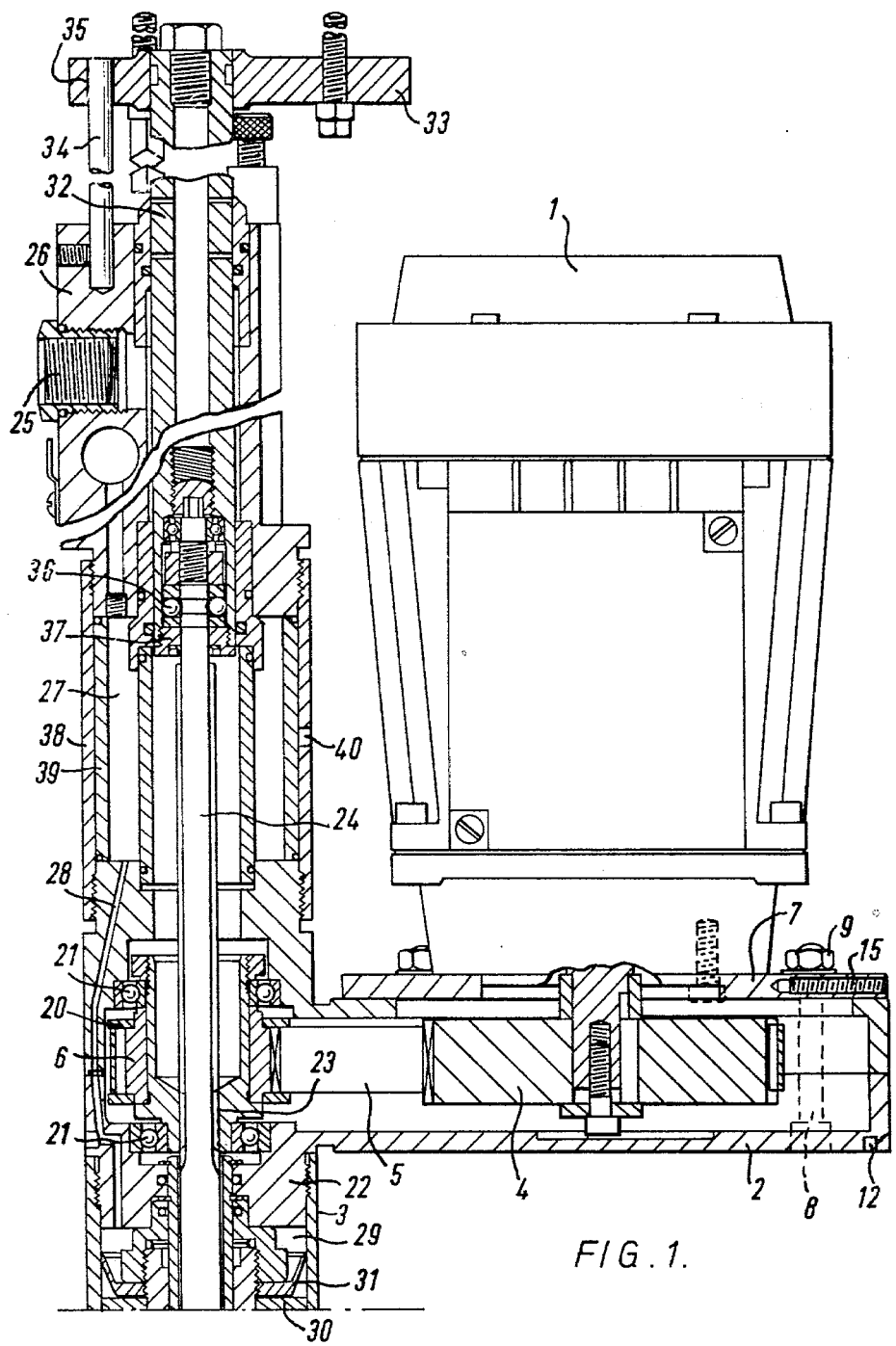
FIG. 1 is a cross-section through part of a first embodiment of a rotary tool according to the invention.
Figures 2, 3:
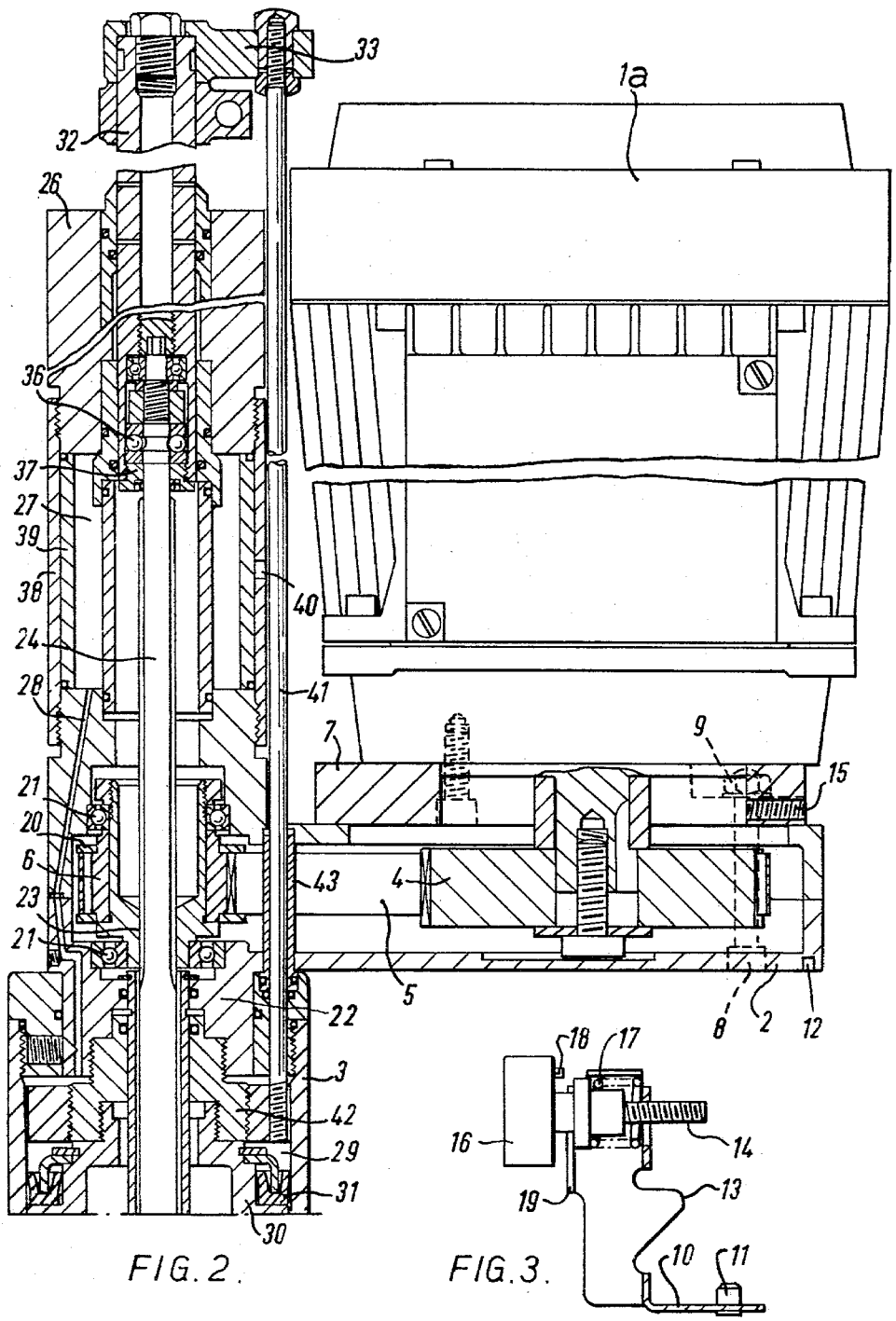
FIG. 2 is a cross-section through part of a second embodiment of a rotary tool according to the invention.
FIG. 3 is a schematic illustration of a belt tensioning device according to the invention.

In FIGS. 1 and 2, the tool has been foreshortened for ease of illustration. The lower end of the tool is not shown, but this will be conventional, and will carry a working head at its lower end.

The tool is driven by an electric motor 1. This motor is mounted on a casing 2 which is rigidly attached to the elongate tool housing 3. The motor 1 drives a toothed pulley wheel 4, and a toothed belt 5 runs around the pulley wheel 4 and around another pulley wheel 6 on the axis of the tool. The motor 1 is supported on the casing 2 on a motor plate 7. The plate 7 is secured by a number of bolts 8 with nuts 9 which pass through elongate holes in the plate 7. When the nuts 9 are slackened, the plate 7 can be moved in the direction of tensioning or slackening the belt 5. For correct operation of the drive, it is important that the belt should be at the correct tension. FIG. 3 shows a device which can be fitted to the casing 2 to produce the correct tension. The device shown in FIG. 3 has a base 10 with retaining studs 11. The studs 11 fit into correspondingly shaped recesses 12 in the underside of the casing 2. The device in FIG. 3 also has abutments 13 which contact the side wall of the casing 2, and a threaded adjusting screw 14 which engages in a threaded bore 15 in the motor plate 7. The adjusting screw 14 has a knob 16, and a compression spring 17 is arranged in the device as shown. To tension the belt, the nuts 9 are slackened so that the motor plate 7 is free to slide. The device is then attached to the casing 2 with the lugs 11 in the recesses 12 and the abutments 13 against the casing side. As the screw 14 is screwed into the threaded bore 15, the plate 7 is moved towards the knob 16, or to the right as viewed in FIGS. 1 and 2. As the tension in the belt 5 increases, it becomes progressively more difficult to pull the plate 7 against the tension of the belt, and the spring 17 will compress as the knob 16 and screw 14 continue to be turned. The knob 16 has a projection 18. When the desired tension in the belt 5 has been reached, this projection 18 engages between flanges on the face 19 of the device and prevents further rotation. When this condition has been reached, the nuts 9 can be tightened, and once they have been tightened the device of FIG. 3 can be removed from the tool. The device thus provides a simple and accurate way of achieving the correct tension in the belt 5. The spring 17 can be choosen so that its characteristics produce the desired tension in the belt. For different sizes of tools, different belt tensions may be necessary, and therefore devices with springs 17 of different characteristics can be employed.

The pulley wheel 6 has flanges 20 for locating the belt correctly on the pulley. The pulley wheel itself is carried in bearings 21 in a fixed housing part 22 which is in fact integral with the motor pulley casing 2. The pulley wheel 6 has an internal bore with splines 23 which engage with a splined spindle 24. The spindle 24 can move longitudinally through the pulley 6 while the splines maintain a driving connection. The spindle 24 is connected to the working head (not shown) of the tool, and transmits the necessary rotation from the motor 1.

To provide the feed motion, compressed air is introduced into the tool via an inlet 25 in the control top 26. The compressed air is fed through passages (not shown) to a chamber 27, and from chamber 27 via a passage 28 to another chamber 29. Within the chamber 29, there is a piston 30 with a piston seal 31, and when pressure builds up in chamber 29 the piston 30 is displaced downwards together with the spindle 24, which thereby slides through the splines 23.

A control rod 32 extends from the top of the tool above the control top 26. A cross head 33 is clamped to the control rod 32, but can be unclamped and slid along the length of the control rod to provide a coarse stroke adjustment. A guide pin 34 is fixed in the control top 26 and slides through a bore 35 in the cross head 33, to restrain the control rod 32 from rotating, but to permit the control rod to be displaced along the axis of the tool.

The control rod 32 is connected to the upper end of the spindle 24 by a thrust bearing 36. Looking at the assembly around the thrust bearing 36 in more detail, it will be seen that the central bore of the control rod 32 is enlarged, and has a plug 37 at its bottom end which forms an abutment for one side of the bearing 36. As the spindle 24 is moved downwards through the pulley wheel 6, it will therefore pull the control rod 32 with it. Since the control rod 32 is prevented from rotating by the guide pin 34, there will be relative rotation between the spindle 24 and the control rod 32 at the thrust bearing 36.

With the device shown, it is possible to rotate the control top relative to the rest of the tool. It will be appreciated that the tool is asymmetric because of the presence of the electric motor 1 on one side. When a number of tools are mounted close together to form a unit, they may have to be mounted with the electric motor on each tool facing away from the area of the workpiece. In order to enable the adjustments, which are available at the control top, to be set for all the tools simultaneously, it is convenient if the control top of each tool can be rotated so that the control tops on all tools are in the same relative orientation to an operator at one side of the unit. To this end, a sleeve 38 is used to connect the control top 26 and the housing part 22. The sleeve 38 has threads of opposite hand at each end which mate with corresponding threads on the control top and the housing part 22, respectively. A spacer 39 is provided between the housing part 22 and the control top. In order to alter the orientation of the control top relative to the tool, the sleeve 38 is unscrewed, and an aperture 40 is provided in the circumference of the sleeve for engagement by a suitable tool. Once the sleeve 38 has been slackened, the control top can be rotated by hand to the correct orientation, and the sleeve 38 can then be tightened up against the spacer 39 to lock the control top in its new orientation.

The tool shown in FIG. 2 is of a larger rating than that shown in FIG. 1, and it will be immediately apparent that the electric motor 1a is of a larger size relative to the tool housing.

In FIG. 2, many parts are the same as in FIG. 1, and so they will be designated by the same reference numerals.

With the tool shown in FIG. 2, the thrust bearing 36 may not be strong enough for the job. To explain why this is so, it is first necessary to be aware that hydraulic check units may be fitted to these tools in the region of the control top. The hydraulic check unit is normally set to come into operation just before the drill tip breaks through the workpiece, to check the speed of advance of the drill at the moment of breakthrough. When drilling with the check unit in operation, a considerable load will fall on the thrust bearing 36 because pneumatic pressure is operating to push the spindle 24 downwards, whereas the resilience of the hydraulic check unit is operating to prevent the control rod 32 from being moved downwards.

Because of this problem, the tool shown in FIG. 2 is provided with a tie rod 41 extending between the cross head 33 and a part 42 which moves with the piston 30. Neither the part 42 nor the piston 30 rotate during operation of the tool. The tie rod 41 passes through a sleeved bore 43 in the motor drive pulley housing 2. This tie rod prevents excessive strain being put on the thrust bearing 36, and may make it possible to dispense with the thrust bearing 36 altogether. When the tie rod 41 is in position, the cross head 33 and piston 30 both advance together at the same speed. The use of tie rod 41 can make it possible to dispense with the guide pin 34 shown in FIG. 1.

The electric motor 1 or 1a is of a standard type which is readily available commercially. It is possible to exchange the drive pulley 4 for another pulley of a different diameter in order to alter the transmission ratio.

Because the control top and control rod in the tools described can be constructed identically with pneumatically driven tools, it is possible to arrange both pneumatically and electrically driven tools together in the same unit, and to carry out identical adjustments for both types of tool. This can be a very significant advantage when electrically driven tools are used in places where pneumatically driven tools are already in use, and where no more pneumatic tools can be used because of a shortage of compressed air.

We claim:

1. A power feed rotary tool having a working head and an electric motor with an output shaft for rotating the working head, a pneumatic system for feeding the working head towards a workpiece, an elongate housing with the working head at one end thereof, a drive train within the housing for rotating the working head, a piston within the housing for feeding the working head as it rotates towards the workpiece, a control rod at the other end of the housing, means for restraining said control rod from rotating with respect to said housing and connecting said control rod to the drive train so that said control rod is fed together with the working head, the control rod including an abutment for limiting the feeding of the working head, means for drivingly connecting said electric motor to said drive train between the ends of said housing comprising a toothed drive belt, a toothed driving pulley on the motor output shaft and a toothed driven pulley in the drive train, and drive belt being operatively connected to said pulleys, and a device for tensioning said drive belt comprising an adjustable motor mount for mounting said motor on said housing, means on said device for engaging said housing to retain said device in fixed position relative to said housing means, including a threaded member on said device for engaging said adjustable motor mount, said threaded member being rotatable to move said drivingly pulley away from said driven pulley, a compression spring operatively associated with said threaded member, and means for preventing rotation of the threaded member when a predetermined degree of compression of the spring has been reached to provide the correct tension in said drive belt.

2. A tool as claimed in claim 1, and further comprising a knob attached to said threaded member, and wherein said means to prevent rotation of said threaded member comprises an axial projection on the knob and stop means on said device which engages said projection when said predetermined degree of compression has been reached to prevent further rotation of the threaded member.

3. A power feed rotary tool having a working head and an electric motor with an output shaft for rotating the working head, a pneumatic system for feeding the working head towards a workpiece, an elongate housing with the working head mounted at one end thereof, a drive train within said housing for rotating said working head, a piston operatively mounted within the housing to be actuated by said pneumatic system and connected to the working head for feeding the working head as it rotates towards the workpiece, a control rod at the other end of the housing, a cross head mounted on said control rod, an abutment means mounted on said cross-head for limiting the feed of the working head, a thrust bearing means operatively connecting said control rod with said drive train and means for restraining said control rod from rotating with respect to said housing and connecting said control rod to said drive train comprising an elongate tie-rod extending parallel to the tool axis and connected at its ends to said cross-head and piston.

4. A power feed rotary tool having a working head and an electric motor with an output shaft for rotating the working head, a pneumatic system for feeding the working head towards a workpiece, an elongate housing with the working head at one end thereof, a drive train within the housing for rotating the working head, a piston operatively mounted within the housing and connected to the working head for feeding the working head, as it rotates, towards the workpiece, a control rod at the other end of the housing, means for restraining said control rod from rotating with respect to said housing and connecting said control rod to the drive train so that said control rod is fed together with the working head, the control rod including an abutment for limiting the feeding of the working head, means for drivingly connecting the electric motor to the drive train between said ends of the housing, a control top mounted on the other end of said housing, a sleeve between the control top and the remainder of said housing, screw threads at the ends of said sleeve engageable with corresponding screw threads on the control top and said remainder of the housing respectively, and a spacer holding said control top and said remainder of the housing in spaced relationship so that the control top is secured in position when said sleeve is tightened on said screw threads and can be rotated to any angular position relative to said housing when said sleeve is loosened on said screw threads.

5. A tool as claimed in claim 3 or 4, wherein said means for drivingly connecting said electric motor to said drive train comprises a toothed belt, a toothed driving pulley on the motor output shaft and a toothed driven pulley in the drive train, said toothed belt being operatively connected to said pulleys.

6. A tool as claimed in claim 5, wherein said driven pulley in the drive train is fixedly mounted axially of the tool and has a central splined bore, and said drive train includes a correspondingly splined elongate spindle which passes through said bore in engaging relationship, said elongate spindle being longitudinally movable through the bore as the working head is fed towards the work piece, so that said driving connection between said pulleys is maintained as the working head is displaced.

* * * * *